(12) United States Patent
Chiou et al.

(10) Patent No.: US 7,395,156 B2
(45) Date of Patent: Jul. 1, 2008

(54) SYSTEM AND METHOD FOR GEO-REGISTRATION WITH GLOBAL POSITIONING AND INERTIAL NAVIGATION

(75) Inventors: Kuo-Liang Chiou, West Hills, CA (US); Kevin E. Rudolph, Manhattan Beach, CA (US); Carroll C. Chiou, West Hills, CA (US)

(73) Assignee: Raytheon Company, Waltham, MA (US)

( * ) Notice: Subject to any disclaimer, the term of this patent is extended or adjusted under 35 U.S.C. 154(b) by 260 days.

(21) Appl. No.: 11/159,475

(22) Filed: Jun. 23, 2005

(65) Prior Publication Data

US 2006/0293854 A1 Dec. 28, 2006

(51) Int. Cl.
*G01C 21/00* (2006.01)
(52) U.S. Cl. .......................... 701/301; 342/65
(58) Field of Classification Search ................. 701/301, 701/200, 207, 220, 223, 208, 225; 342/25 A, 342/25 R, 63–65, 53, 357.01; 180/167, 169
See application file for complete search history.

(56) References Cited

U.S. PATENT DOCUMENTS

| | | | |
|---|---|---|---|
| 4,495,580 A * | 1/1985 | Keearns ...................... | 701/217 |
| 5,432,520 A | 7/1995 | Schneider et al. | |
| 5,485,384 A | 1/1996 | Falconnet | |
| 5,963,653 A | 10/1999 | McNary et al. | |
| 6,496,778 B1 * | 12/2002 | Lin ............................ | 701/215 |
| 6,630,904 B2 * | 10/2003 | Gustafson et al. ....... | 342/357.06 |
| 6,697,736 B2 * | 2/2004 | Lin ............................ | 701/214 |
| 6,744,401 B2 * | 6/2004 | Hager et al. ................ | 342/173 |
| 6,865,477 B2 * | 3/2005 | Nicosia et al. .............. | 701/207 |
| 6,912,464 B1 * | 6/2005 | Parker ........................ | 701/221 |

OTHER PUBLICATIONS

Arthur Gelb, et al., "Applied Optimal Estimation", p. 110, The M.I.T. Press, Massachusetts Institute of Technology,Cambridge, Massachusetts, and London, England, date is not available.
Hassan Mostafavi and Fred W. Smith, "Image Correlation with Geometric Distortion Part I: Acquisition Performance", pp. 487-493, May 1978 vol. AES-14, No. 3 IEEE Transactions on Aerospace Systems.
J.E. Bevington and C.A. Marttila, "Precision Aided Inertial Navigation Using Sar and Digital Map Data", pp. 490-496, 1990 IEEE, CH2811-8/90/0000/0490.
R. Chellappa, Q. Zheng, P. Burlina, C. Shekhar and K. Eom, "On the Positioning of Multisensor Imagery for Exploitation and Target Recognition", pp. 120-138, Jan. 1997, IEEE vol. 85, No. 1.
Kuo-Linag Chiou et al.,Aided INS/GPS Navigation with Geo-registered Imageries, Apr. 19, 2005.

* cited by examiner

*Primary Examiner*—Dalena Tran
(74) *Attorney, Agent, or Firm*—Leonard A. Alkov

(57) ABSTRACT

A position estimation system including a first arrangement for providing an image with a known target in a known reference frame. A second arrangement correlates the image with a stored image. The correlation is used to compute an error with respect to a position estimate. In a specific embodiment, the error is referenced with respect to first (x), second (y) and third (z) directions. A target location error is computed with respect to a stored image provided by a target image catalog. The target image catalog includes target geo-locations and digital terrain elevation data. In an illustrative application, the image data is provided by synthetic aperture radar and forward-looking infrared systems. An observation model and a measure noise matrix are Kalman filtered to ascertain a position error in navigation data generated by an integrated inertial navigation and Global Positioning system.

40 Claims, 3 Drawing Sheets

SYSTEM AND METHOD FOR GEO-REGISTRATION WITH GLOBAL POSITIONING AND INERTIAL NAVIGATION

BACKGROUND OF THE INVENTION

1. Field of the Invention

The present invention relates to inertial navigation and global position. More specifically, the present invention relates to systems and methods for improving the GPS counter-jamming performance of inertial navigation systems.

2. Description of the Related Art

Inertial navigation systems typically use gyroscopes and accelerometers to provide precision vehicular navigation. Unfortunately, inertial navigation accuracy degrades because of instrument calibration errors and other errors. These navigation errors typically grow as a function of time. Independent observations of the vehicle navigation information are needed to bind these navigation errors. Therefore, sensors, other than INS, are needed in order to obtain independent navigation information. Hence, a conventional approach for correcting these errors involves the integration of a Global Position System (GPS) receiver with the inertial navigation system. However, the GPS is vulnerable to jamming which can impede the ability of the GPS system to correct the inertial navigation errors.

Typically, to counter the effects of GPS jamming, designers have endeavored to: 1) improve the accuracy of the inertial navigation system and 2) make the GPS receiver resistant to jamming. However, these approaches are expensive and limited in efficacy.

Hence, a need remains in the art for an effective yet inexpensive system or method for improving the navigation accuracy of integrated inertial navigation and Global Positioning Systems.

SUMMARY OF THE INVENTION

The need in the art is addressed by the position estimation system of the present invention. In a most general implementation, the inventive system includes a first arrangement for providing an image including a known target in a known reference frame. A second arrangement correlates the image with a stored image. The correlation is used to compute an error with respect to a position estimate.

In a specific embodiment, the error is referenced with respect to first (x), second (y) and third (z) directions. A target location error is computed with respect to a stored image provided by a target image catalog. The target image catalog includes target geo-locations and digital terrain elevation data. In an illustrative application, the image data is provided by synthetic aperture radar or forward-looking infrared systems. An observation model and a measure noise matrix are Kalman filtered to ascertain a position error in navigation data generated by an integrated inertial navigation and Global Positioning system.

In the illustrative application, geo-registered SAR/FLIR imagery is used to track targets and to determine a target location error (TLE). This TLE information is a set of error equations that describe the relationship between vehicle navigation information and target data. In accordance with the invention, this relationship is used to form an observation model for vehicle navigation with respect to target locations. Using Kalman filtering and the observation model, vehicle navigation errors can be bound and the navigation accuracy of the vehicle can be improved.

DESCRIPTION OF THE INVENTION

Figure 1:
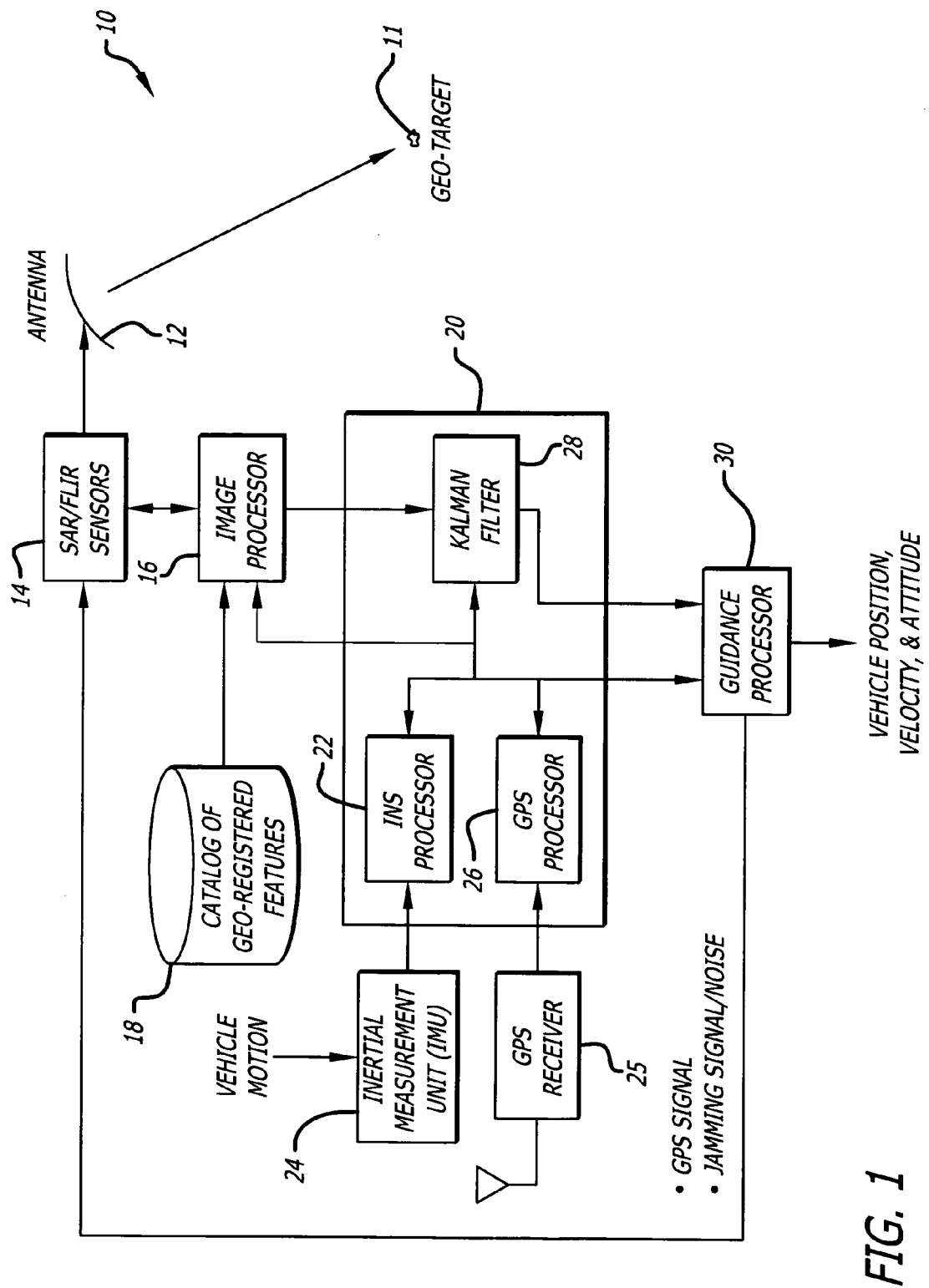
FIG. 1 is a block diagram of an illustrative implementation of a position estimation system in accordance with the present teachings.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

In general, in accordance with the present teachings, geo-registered SAR/FLIR imagery is used to track targets and to determine a target location error (TLE). The TLE is generated by a set of error equations that describe the relationship between the vehicle (sensor) navigation information and the target location. The geo-registered images obtained from SAR/FLIR systems provide position estimates for a known pixel on the ground or other reference frame through target recognition methods. This position estimate serves as an independent observation to bind errors in an inertial navigation system.

U.S. Pat. No. 5,485,384 entitled ON-BOARD NAVIGATION SYSTEM FOR AN AERIAL CRAFT INCLUDING A SYNTHETIC APERTURE SIDEWAYS LOOKING RADAR issued Jan. 16, 1996 to B. Falconnet (hereinafter the "Falconnet" patent) the teachings of which are hereby incorporated herein by reference appears to teach the use of SAR (Synthetic Aperture Radar) sensors to obtain target imagery in the x and y horizontal plane. (See also U.S. Pat. No. 5,432,520 issued Jul. 11, 1995 to Schneider et al. and entitled SAR/GPS INERTIAL METHOD OF RANGE MEASUREMENT, the teachings of which are herby incorporated herein by reference.) This imagery is then correlated with maps of the geo-locations that are pre-stored in the database to obtain two error equations in the x and y directions. These two error equations serve as an observation model for the Kalman filter to bind the vehicle navigation errors.

In accordance with the present invention, Falconnet's teachings are extended by: 1) including a third dimensional axis, the altitude of a target image location and 2) providing a specific teaching as to how the third dimension can be used to improve the navigational accuracy of an integrated INS/GPS navigation system. The geo-registered imagery is extended to sensors from SAR or FLIR (forward-looking infrared) systems. A simple first order error model in the computed target geo-location is used to illustrate the effectiveness of Kalman filter updating using geo-registration imagery. Detailed x, y, and z observation equations are provided which involve the vehicle's position, velocity, and attitude, as well as the angle between the horizontal plane and the slant plane. The position error differences can be minimized through optimal estimation techniques, such as Kalman filter, to bind INS navigation errors. The equations form an observation matrix in a Kalman filter.

The method described in this invention can also be extended to any sensor on the vehicle that produces target location errors (TLE) on the known target image because the TLE equations can be reduced to a set of equations related to the-vehicle navigation errors and target image position errors.

FIG. 1 is a block diagram of an illustrative implementation of a position estimation system in accordance with the present teachings. The inventive system 10 includes an antenna array 12 which feeds a synthetic aperture radar (SAR) sensor 14. The sensor 14 is also adapted to process FLIR images. In accordance with the present teachings, the images provided by the SAR/FLIR sensor 14 are input to an image processor 16. The image processor 16 uses data from a catalog of geo-registered features 18 to identify a target in a known reference frame as discussed more fully below. Those skilled in the art will appreciate that the known reference frame may be a surface other than the surface of the earth without departing from the scope of the present invention. The output of the image processor 16 is input to an INS/GPS integrator 20. The integrator 20 includes an INS processor 22, a GPS processor 26 and a Kalman filter 28. The INS processor 22 receives vehicle motion data from an on-board inertial measurement unit 24. The GPS processor 26 receives a GPS signal along with noise and, in some environments, a GPS jamming signal from a GPS receiver 25. The integrator 20 outputs vehicle position, velocity, and attitude errors to a guidance processor 30. The guidance processor 30 outputs vehicle position, velocity and attitude information, corrected in accordance with the present teachings, for use in a conventional manner. The guidance processor 30 also feeds position, velocity, and velocity errors and range from the sensor to the target, back to the SAR/FLIR sensor 14 for generating TLE equations.

Figure 2:
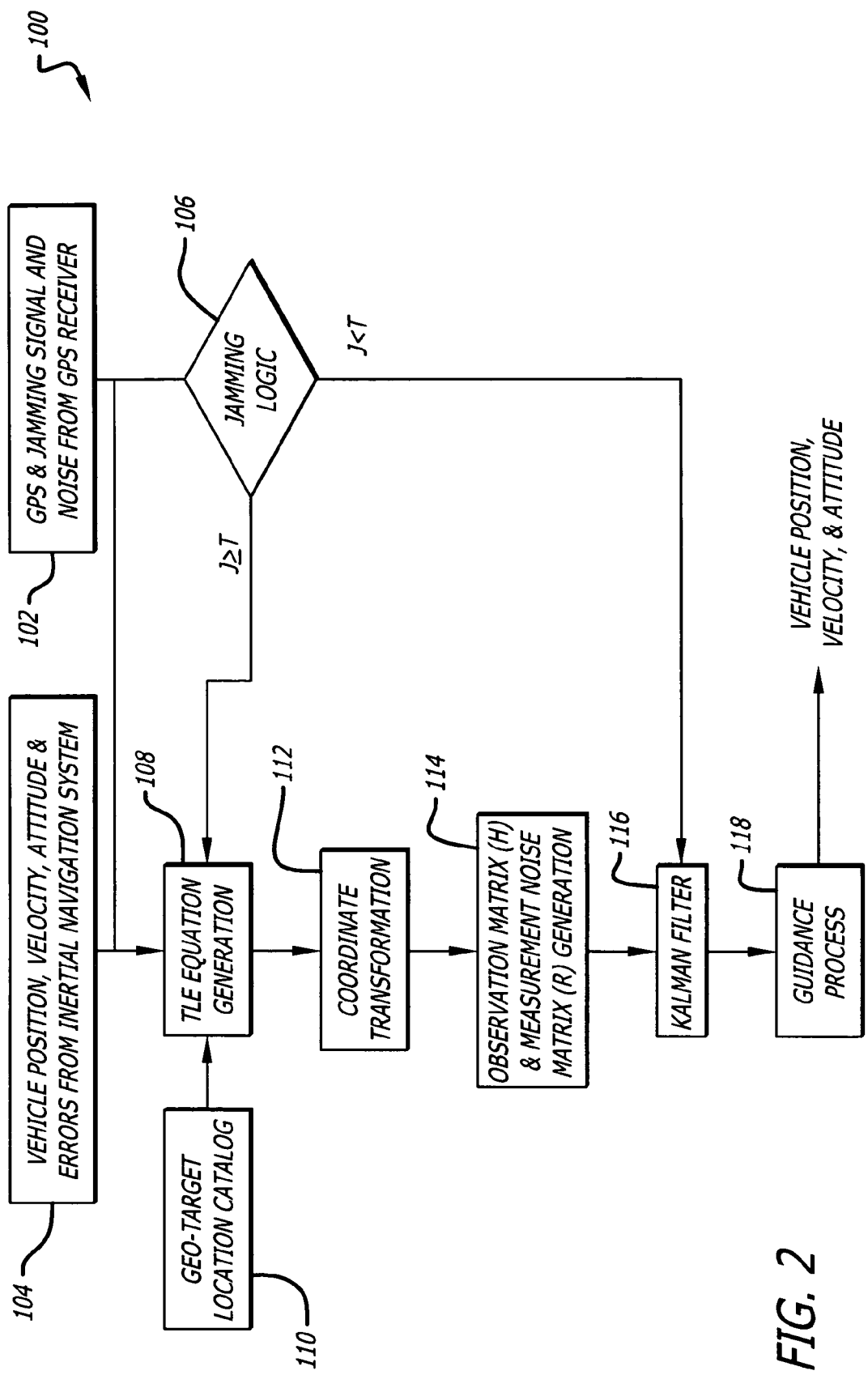
FIG. 2 is a simplified flow diagram showing an illustrative implementation of a position estimation method in accordance with the present teachings.

FIG. 2 is a simplified flow diagram showing an illustrative implementation of a position estimation method in accordance with the present teachings. In the best mode, the method 100 is implemented in software by the image processor 16 of FIG. 1. As illustrated in FIG. 2, the method 100 includes the step 102 of providing a GPS signal from the GPS receiver 25 via the GPS processor 26 (FIG. 1) and the step 104 of providing vehicle position, velocity, attitude and errors from the IMU 24 via the INS processor 22 (FIG. 1). This data is analyzed by jamming logic at step 106 to ascertain whether a jamming signal 'J' is present and whether the jamming signal J exceeds a threshold 'T'.

If J<T, then the data from the INS and GPS processors 22 and 26 is input to the Kalman filter 28 (FIG. 1) directly at step 116.

If, however, J≧T, then at step 108 the system 10 generates target location error (TLE) equations drawing data from the catalog of geo-registered features 18 (FIG. 1) at step 110. Next, at step 112, the coordinates generated at step 108 are transformed. At step 114, an observation matrix (H) and a measurement noise matrix (R) are generated. At step 116, this data is passed to the Kalman filter to bind the navigation error as discussed above. At step 118, the output of the Kalman filtering step 116 is used in a guidance process in a conventional manner.

Returning to FIG. 1, the catalog 18 is defined as the image and location of each target image. This catalog details geo-locations and DTED (Digital Terrain Elevation Data). Based on the vehicle trajectory supplied by the INS/GPS process, the image processor 16 determines which geo-target in the catalog 18 needs to be sighted. The processor 16 then sends this information to the SAR/FLIR sensor 14 to locate and then to execute the geo-registered imagery. The SAR/FLIR sensor 14 determines the location of the geo target and correlates this imagery with the information in the catalog to determine the accuracy of the observation.

Errors in computed target geo-location can be primarily attributed to three major sources: sensor position errors, sensor bearing errors and DTED errors. In accordance with the present teachings, these errors are treated as being statistically independent and zero mean Gaussian. For the sake of simplicity, all other errors are assumed to be relatively small and are ignored. It is also assumed that the image of the target can be acquired. The DTED noise is treated herein as part of the measurement noise in the z-direction of an ECEF (Earth Center Earth Fixed) coordinate frame.

Errors in the sensor are directly transformed into the slant coordinate frame and then transformed to the platform coordinate frame. The slant coordinate frame is defined as follows: $x_s$ is along the vehicle velocity axis $\vec{V}$, the $z_s$ is perpendicular to the slant plane which is the plane that passes through $\vec{V}_D$ and $\vec{R}$, and $y_s$ forms a right-hand coordinate system.

Therefore, errors due to the sensor position errors in the slant coordinate frame are derived as follows:

$$dx_s = \Delta \vec{r} \cdot \frac{\vec{v}}{v} + \Delta \vec{r} \cdot \vec{R} \cdot \cos\phi \qquad [1]$$

$$dy_s = \Delta \vec{r} \cdot \vec{R} \cdot \sin\phi$$

$$dz_s = \Delta \vec{r} \cdot \frac{\vec{V} \times \vec{R}}{|\vec{V} \times \vec{R}|}$$

where $\Delta \vec{r}$ and $\Delta \vec{V}$ are the vectors of the vehicle navigation position and velocity errors, respectively, in the body coordinate frame. $\vec{V}$ is the velocity vector of the vehicle, $\vec{R}$ is the range vector from the vehicle position to the known geo-location, and $\phi$ is the angle between the vehicle flight path and line of sight between vehicle and the target image.

The errors due to sensor bearing errors, in the slant coordinate frame, are derived as follows:

$$dx_s = \frac{\Delta \vec{V}}{V} \cdot \frac{\vec{V}}{V} + \frac{\Delta \vec{V}}{V} \cdot \vec{R} \cdot \cos\phi \qquad [2]$$

$$dy_s = \frac{\Delta \vec{V}}{V} \cdot \vec{R} \cdot \sin\phi$$

$$dz_s = \frac{\Delta \vec{V}}{V} \cdot \frac{\vec{V} \times \vec{R}}{|\vec{V} \times \vec{R}|}$$

Next, we combine the errors provided by equations [1] and [2] to obtain the following errors $dx_s$, $dy_s$, and $dz_s$ that are in the slant coordinate frame.

$$dx_s = \left(\Delta \vec{r} + \frac{\Delta \vec{V}}{V}\right) \cdot \left(\frac{\vec{V}}{V} + \vec{R} \cdot \cos\phi\right) \qquad [3]$$

$$dy_s = \left(\Delta \vec{r} + \frac{\Delta \vec{V}}{V}\right) \cdot \vec{R} \cdot \sin\phi$$

-continued $$dz_s = \left(\Delta \vec{r} + \frac{\Delta \vec{V}}{V}\right) \cdot \frac{\vec{V} \times \vec{R}}{|\vec{V} \times \vec{R}|}$$

Figure 3:
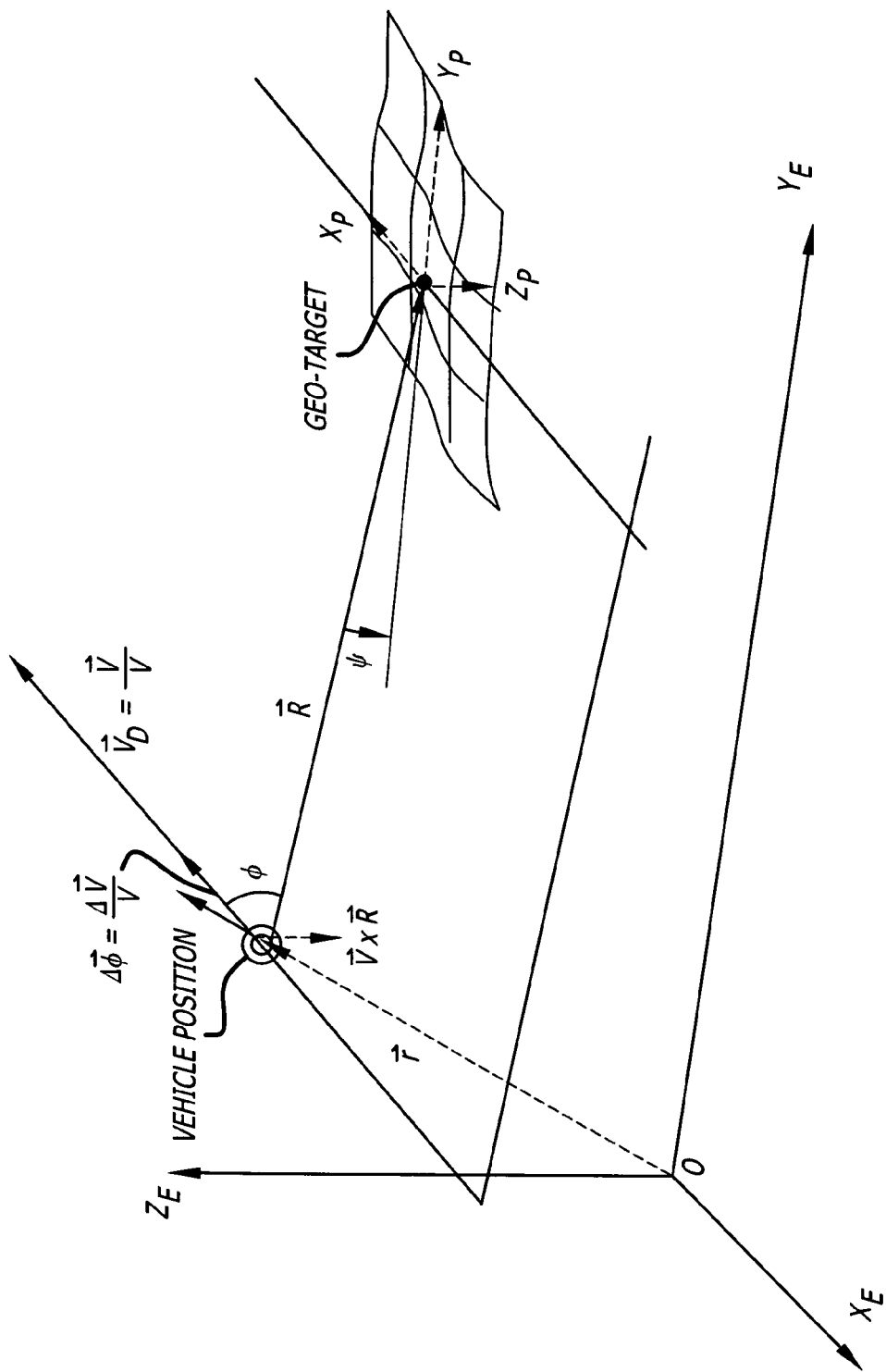
FIG. 3 is a diagram showing a geo-sighting error model in three dimensions in accordance with an illustrative application of the present teachings.

Next, converting these errors, $dx_s$, $dy_s$, and $dz_s$ into the platform coordinate frame by the angle $\psi$ (see FIG. 3).

FIG. 3 is a diagram showing a geo-sighting error model in three dimensions in accordance with an illustrative application of the present teachings. The platform coordinate frame (vehicle body coordinate frame) is defined as follows: $x_p$ is vehicle velocity direction, $y_p$ is the vehicle right wing, and $z_p$ forms a right hand coordinate system. The relationship between the slant coordinate frame and the platform coordinate frame is as follows:

$$\begin{pmatrix} dx_p \\ dy_p \\ dz_p \end{pmatrix} = \begin{pmatrix} 1 & 0 & 0 \\ 0 & \cos\psi & -\sin\psi \\ 0 & \sin\psi & \cos\psi \end{pmatrix} \begin{pmatrix} dx_s \\ dy_s \\ dz_s \end{pmatrix} \quad [4]$$

Inserting equation [3] into equation [4]:

$$dx_p = \left(\Delta \vec{r} + \frac{\Delta \vec{V}}{V}\right) \cdot \left(\frac{\vec{V}}{V} + \vec{R} \cdot \cos\phi\right) \quad [5]$$

$$dy_p = \left(\Delta \vec{r} + \frac{\Delta \vec{V}}{V}\right) \cdot \vec{R} \cdot \sin\phi \cdot \cos\psi - \left(\Delta \vec{r} + \frac{\Delta \vec{V}}{V}\right) \cdot \frac{\vec{V} \times \vec{R}}{|\vec{V} \times \vec{R}|} \cdot \sin\psi$$

$$dz_p = \left(\Delta \vec{r} + \frac{\Delta \vec{V}}{V}\right) \cdot \vec{R} \cdot \sin\phi \cdot \sin\psi + \left(\Delta \vec{r} + \frac{\Delta \vec{V}}{V}\right) \cdot \frac{\vec{V} \times \vec{R}}{|\vec{V} \times \vec{R}|} \cos\psi$$

where:

$$\psi = \tan^{-1}\frac{R_z}{\sqrt{R_x^2 + R_y^2}} \text{ and } \vec{R} = (R_x, R_y, R_z). \quad [6]$$

The classical Kalman filter is described as follows:

$$\vec{x}_k = \Phi_{k-1}\vec{x}_{k-1} + \vec{w}_{k-1}, \ \vec{w}_k \sim N(\vec{0}, Q_k)$$

$$\vec{z}_k = H_k \vec{x}_k + \vec{v}_k, \ \vec{v}_k \sim N(\vec{0}, R_k)$$

$$E[\vec{x}(0)] = \vec{x}_0, E[\vec{x}_0 \vec{x}_0^T] = P_0, E[\vec{w}_j \vec{v}_k^T] = \vec{0} \ \forall j,k \quad [7]$$

$$P_k^- = \Phi_{k-1}P_{k-1}^+\Phi_{k-1}^T + Q_{k-1}$$

$$P_k^+ = (I - K_k H_k)P_k^-$$

$$K_k = P_k^- H_k^T [H_k P_k^- H_k^T + R_k]^{-1}$$

where $\Phi_k$ is the transition matrix.

In accordance with the present teachings, an observation matrix $H_k$ and the observation (measurement) noise $R_k$ are generated as follows. Assume that $\Delta \vec{r}$ and $\Delta \vec{V}$ are the first six Kalman filter error states defined as $\Delta \vec{r} = (\delta r_x, \delta r_y, \delta r_z)^T$ and $\Delta \vec{V} = (\delta V_x, \delta V_y, \delta V_z)^T$ in the platform coordinate frame where superscript T denotes the transpose of the vector. Note that if $\Delta \vec{r}$ and $\Delta \vec{V}$ are defined in the ECEF coordinate frame, then these error states need to be transformed into the platform frame where the error equations [5] are defined. The Kalman filter error state $\vec{x}_k$, observation matrix $H_k$, and measurement noise matrix $R_k$ are denote as below:

$$\vec{x}_k = (\delta r_x, \delta r_y, \delta r_z, \delta V_x, \delta V_y, \delta V_z, 0, \ldots, 0)^T, \quad [8]$$

$$H_k = \begin{pmatrix} h_{00}, h_{01}, h_{02}, h_{03}, h_{04}, h_{05}, 0, \ldots, 0 \\ h_{10}, h_{11}, h_{12}, h_{13}, h_{14}, h_{15}, 0, \ldots, 0 \\ h_{20}, h_{21}, h_{22}, h_{23}, h_{24}, h_{25}, 0, \ldots, 0 \end{pmatrix},$$

$$\text{and } R_k = \begin{pmatrix} r_{00}, & 0, & 0 \\ 0, & r_{11}, & 0 \\ 0, & 0, & r_{22} \end{pmatrix}$$

Assume that the vectors $\vec{R} = (R_x, R_y, R_z)$, $V = |\vec{V}|$ (magnitude of $\vec{V}$), $R = |\vec{R}|$, $$\frac{\vec{V}}{V} = (p_x, p_y, p_z), \text{ and } \frac{\vec{V}}{V} \times \frac{\vec{R}}{R} = (q_x, q_y, q_z).$$

Therefore, equation [5] can be expressed in the following forms:

$$dx_p = (p_x + R_x \cdot \sin\phi)\delta r_x + (p_y + R_y \cdot \sin\phi)\delta r_y + \quad [9]$$
$$(p_z + R_z \cdot \sin\phi)\delta r_z + [(p_x + R_x \cdot \sin\phi)/V]\delta V_x + [$$
$$(p_y + R_y \cdot \sin\phi)/V]\delta V_y + [(p_z + R_z \cdot \sin\phi)/V]\delta V_z$$

$$dy_p = (R_x \cdot \sin\phi \cdot \cos\psi - q_x \cdot \sin\psi)\delta r_x + (R_y \cdot \sin\phi \cdot \cos\psi - q_y \cdot \sin\psi)\delta r_y +$$
$$(R_z \cdot \sin\phi \cdot \cos\psi - q_z \cdot \sin\psi)\delta r_z + [(R_x \cdot \sin\phi \cdot \cos\psi - q_x \cdot \sin\psi)/V]$$
$$\delta V_x + [(R_y \cdot \sin\phi \cdot \cos\psi - q_y \cdot \sin\psi)/V]\delta$$
$$V_y + [(R_z \cdot \sin\phi \cdot \cos\psi - q_z \cdot \sin\psi)/V]\delta V_z$$

$$dz_p = (R_x \cdot \sin\phi \cdot \sin\psi + q_x \cdot \cos\psi)\delta r_x + (R_y \cdot \sin\phi \cdot \sin\psi + q_y \cdot \cos\psi)\delta r_y +$$
$$(R_z \cdot \sin\phi \cdot \sin\psi + q_z \cdot \cos\psi)\delta r_z + [(R_x \cdot \sin\phi \cdot \sin\psi + q_x \cdot \cos\psi)/V]$$
$$\delta V_x + [(R_y \cdot \sin\phi \cdot \sin\psi + q_y \cdot \cos\psi)/V]\delta$$
$$V_y + [(R_z \cdot \sin\phi \cdot \sin\psi + q_z \cdot \cos\psi)/V]\delta V_z$$

Therefore, the elements in the observation matrix are as follows:

$h_{00} = p_x + R_x \cdot \sin\phi$ $h_{01} = p_y + R_y \cdot \sin\phi$ $h_{02} = p_z + R_z \cdot \sin\phi$ $h_{03} = h_{00}/V$ $h_{04} = h_{01}/V$ $h_{10} = R_x \cdot \sin\phi \cos\psi - q_x \cdot \sin\psi$ $h_{11} = R_y \cdot \sin\phi \cos\psi - q_y \cdot \sin\psi$ $h_{12} = R_z \cdot \sin\phi \cos\psi - q_z \cdot \sin\psi$ $h_{13} = h_{10}/V$ $h_{14} = h_{11}/V$ $h_{15} = h_{12}/V$ $h_{20} = R_x \cdot \sin\phi \sin\psi + q_x \cdot \cos\psi$ $h_{21} = R_y \cdot \sin\phi \sin\psi + q_y \cdot \cos\psi$ $h_{22} = R_z \cdot \sin\phi \sin\psi + q_z \cdot \cos\psi$ $h_{23} = h_{20}/V$ $h_{24} = h_{21}/V$ $h_{25} = h_{22}/V$ and $r_{00}$, $r_{11}$, and $r_{22}$ represent the observation noise in the SAR/FLIR imager accuracy during the geo-target scan. The DTED noise is included in $r_{22}$ term.

In the illustrative embodiment, the sensor position and attitude errors are converted into the slant coordinate frame and then into the platform frame. Errors that may be due to the SAR signal processing and ranging errors are ignored since these errors are assumed to be relatively small. If some of those errors are large enough to be considered, the same method can be used to transform these errors into the platform frame and obtain similar results as equation [11] below:

$$dx_p = \left(\Delta \vec{r} + \frac{\Delta \vec{V}}{V}\right) \cdot \left(\frac{\vec{V}}{V} + \vec{R} \cdot \cos\phi\right)$$

$$dy_p = \left(\Delta \vec{r} + \frac{\Delta \vec{V}}{V}\right) \cdot \vec{R} \cdot \sin\phi \cdot \cos\psi - \left(\Delta \vec{r} + \frac{\Delta \vec{V}}{V}\right) \cdot \frac{\vec{V} \times \vec{R}}{|\vec{V} \times \vec{R}|} \cdot \sin\psi$$

$$dz_p = \left(\Delta \vec{r} + \frac{\Delta \vec{V}}{V}\right) \cdot \vec{R} \cdot \sin\phi \cdot \sin\psi + \left(\Delta \vec{r} + \frac{\Delta \vec{V}}{V}\right) \cdot \frac{\vec{V} \times \vec{R}}{|\vec{V} \times \vec{R}|} \cos\psi$$

[11]

The error states in the Kalman filter should include the vehicle navigation errors such as $\vec{x}_k = (\Delta r_x, \Delta r_y, \Delta r_z, \Delta V_x, \Delta V_y, \Delta V_z, \ldots)^T$. The error equations above can be converted to an observation matrix in the Kalman filer as follows:

$$H_k = \begin{pmatrix} h_{00}, & h_{01}, & h_{02}, & h_{03}, & h_{04}, & h_{05}, & 0, & \ldots, & 0 \\ h_{10}, & h_{11}, & h_{12}, & h_{13}, & h_{14}, & h_{15}, & 0, & \ldots, & 0 \\ h_{20}, & h_{21}, & h_{22}, & h_{23}, & h_{24}, & h_{25}, & 0, & \ldots, & 0 \end{pmatrix}$$

[12]

where $h_{ij}$ are defined above.

In general, coordinate frames of the sensor errors and navigation error states in the Kalman filter are different. They need to transform into the same coordinate frame.

The error equations in equation [1] are, in fact, a TLE in the platform coordinate frame. Based on this invention, any TLE can be extracted and converted into an observation matrix as described in equation [5].

If the sensor SAR/FLIR can only obtain two-dimensional images ($dx_p$, $dy_p$), the observation matrix will be a two-dimensional matrix:

$$H_k = \begin{pmatrix} h_{00}, & h_{01}, & h_{02}, & h_{03}, & h_{04}, & h_{05}, & 0, & \ldots, & 0 \\ h_{10}, & h_{11}, & h_{12}, & h_{13}, & h_{14}, & h_{15}, & 0, & \ldots, & 0 \end{pmatrix}$$

[13]

where the elements $h_{ij}$ are defined as before.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A position estimation system comprising:
    first means for providing an image including a known target in a known reference frame;
    second means for correlating said image with a stored image;
    third means responsive to said second means for computing an error in response thereto, wherein said error is referenced with respect to first (x), second (y) and third (z) directions;
    fourth means responsive to said third means for providing an observation model; and
    fifth means for filtering said model to provide a position estimate.

2. The invention of claim 1 wherein said error is a target location error.

3. The invention of claim 1 wherein said stored image is provided by a catalog.

4. The invention of claim 3 wherein said catalog is a target image catalog.

5. The invention of claim 4 wherein said target image catalog includes target geo-locations.

6. The invention of claim 5 wherein said catalog includes digital terrain elevation data.

7. The invention of claim 1 wherein said fifth means includes a Kalman filter.

8. The invention of claim 1 further including means for providing position data and means for computing said error in response thereto.

9. The invention of claim 8 wherein said means for providing position data includes an inertial navigation system.

10. The invention of claim 9 further including means for providing errors with respect to a slant coordinate frame.

11. The invention of claim 10 further including means for converting said errors with respect to a slant coordinate frame to errors with respect to a platform coordinate frame.

12. The invention of claim 9 wherein said means for providing position data further includes a Global Positioning System receiver.

13. The invention of claim 1 wherein said first means includes a radar system.

14. The invention of claim 13 wherein said radar system includes a synthetic aperture radar.

15. The invention of claim 1 wherein said first means includes an infrared detector.

16. The invention of claim 15 wherein said first means includes a forward-looking infrared detector.

17. The invention of claim 1 further including means for providing an observation matrix.

18. The invention of claim 1 further including means for providing a measurement noise matrix.

19. The invention of claim 1 further including means for using an observation matrix and a measurement noise matrix to correct for said error.

20. A navigation system comprising:
an inertial navigation system;
a Global Positioning System receiver for minimizing an error generated by said inertial navigation system;
means for minimizing an err or in position data generated by said inertial navigation system in response to an output from said receiver, wherein said error is referenced with respect to first (x), second (y) and third (z) directions;
means for detecting interference in reception of said receiver and providing a signal in response thereto;
responsive to said signal for referencing data from target in a known location to minimize an error generated by said inertial navigation system;
means responsive to said means for minimizing for providing an observation model; and
means for filtering said model to provide a position estimate.

21. A position estimation method including the steps of:
providing an image including a known target in a known reference frame;
correlating said image with a stored image;
computing an error in response said step of correlating said image with a stored image, wherein said error is referenced with respect to first (x), second (y) and third (z) directions;
providing an observation model in, response to said error; and
filtering said model to provide a position estimate.

22. The invention of claim 21 wherein said error is referenced with respect to first (x), second (y) and third (z) directions.

23. The invention of claim 21 wherein said error is a target location error.

24. The invention of claim 21 wherein said stored image is provided by a catalog.

25. The invention of claim 24 wherein said catalog is a target image catalog.

26. The invention of claim 25 wherein said target image catalog includes target geo-locations.

27. The invention of claim 26 wherein said catalog includes digital terrain elevation data.

28. The invention of claim 21 further including the step of providing an observation model.

29. The invention of claim 28 further including the step of filtering said model to provide a position estimate.

30. The invention of claim 29 wherein said filtering is effected with a Kalman filter.

31. The invention of claim 21 further including the step of providing position data and means for computing said error in response thereto.

32. The invention of claim 31 wherein said step of providing position data includes the step of securing position data from an inertial navigation system.

33. The invention of claim 32 further including the step of providing errors with respect to a slant coordinate frame.

34. The invention of claim 33 further including the step of converting said errors with respect to a slant coordinate frame to errors with respect to a platform coordinate frame.

35. The invention of claim 32 wherein said step of providing position data further includes a Global Positioning System receiver.

36. The invention of claim 21 further including the step of providing an observation matrix.

37. The invention of claim 21 further including the step of providing a measurement noise matrix.

38. The invention of claim 21 further including the step of using an observation matrix and a measurement noise matrix to correct for said error.

39. A navigation method including the steps of:
providing an inertial navigation system;
providing a Global Positioning System;
minimizing an error in position data generated by said inertial navigation system in response to an output from said receiver, wherein said error is referenced with respect to first (x), second (y) and third (z) directions;
detecting interference in reception of said receiver and providing a signal in response thereto;
referencing data from a target in a known location to minimize an error generated by said inertial navigation system in response to said signal;
providing an observation model in response to said error; and
filtering said model to provide a position estimate.

40. A position estimation system comprising:
first means for providing an image including a known target in a known reference frame;
second means for correlating said image with a stored image;
third means responsive to said second means for computing a position estimate error in response thereto, wherein said error is referenced with respect to first (x), second (y) and third (z) directions;
fourth means for providing an observation matrix;
fifth means for providing a measurement noise matrix; and
sixth means for using an observation matrix and a measurement noise matrix to correct for said error.

* * * * *